(12) United States Patent
Jeong et al.

(10) Patent No.: US 11,801,639 B2
(45) Date of Patent: Oct. 31, 2023

(54) CONTROLLED COOLING FOR PRINT HEADS

(71) Applicant: HEWLETT-PACKARD DEVELOPMENT COMPANY, L.P., Houston, TX (US)

(72) Inventors: Samuel Jeong, Vancouver, WA (US); Michael Ewe, Vancouver, WA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1127 days.

(21) Appl. No.: 16/075,443

(22) PCT Filed: Jul. 28, 2017

(86) PCT No.: PCT/US2017/044376
§ 371 (c)(1),
(2) Date: Aug. 3, 2018

(87) PCT Pub. No.: WO2019/022766
PCT Pub. Date: Jan. 31, 2019

(65) Prior Publication Data
US 2021/0206102 A1    Jul. 8, 2021

(51) Int. Cl.
*B29C 64/364* (2017.01)
*B33Y 30/00* (2015.01)
*B29C 64/209* (2017.01)

(52) U.S. Cl.
CPC .......... *B29C 64/364* (2017.08); *B29C 64/209* (2017.08); *B33Y 30/00* (2014.12)

(58) Field of Classification Search
CPC .............................. B29C 64/364; B41J 29/377
See application file for complete search history.

(56) References Cited

U.S. PATENT DOCUMENTS 4,722,669 A * 2/1988 Kundert .................. F04D 27/00
                                                      318/473
5,237,338 A * 8/1993 Stephenson ............ B41J 29/377
                                                      165/293
(Continued)

FOREIGN PATENT DOCUMENTS

CN    101517481 A    8/2009
CN    105247656 A    1/2016
(Continued)

OTHER PUBLICATIONS

Minionan, "Cooling Duct Fan—Sunhokey Prusa", Retrieved from: https://www.thingiverse.com/thing:1203066, Dec. 15, 2015, 5 pages.
(Continued)

*Primary Examiner* — Joseph S Del Sole
*Assistant Examiner* — Ariella Machness
(74) *Attorney, Agent, or Firm* — SHOOK, HARDY & BACON L.L.P.

(57) ABSTRACT

An electronic device includes a carriage to move along an axis relative to a platform. In addition, the electronic device includes a print head disposed within the carriage to move with the carriage and to deliver a print agent to the platform. Further, the electronic device includes a cooling system. The cooling system includes an air source to deliver air to the print head within the carriage to cool the print head. The cooling system also includes a pressure sensor to measure a pressure of a first zone within the carriage. Moreover, the cooling system includes a controller to control a flow rate of the air into the first zone or from the first zone in response to the measured pressure to maintain the first zone at a positive pressure with respect to a second zone outside the carriage.

8 Claims, 6 Drawing Sheets

(56) References Cited

U.S. PATENT DOCUMENTS

| | | | | |
|---|---|---|---|---|
| 5,455,611 | A | * | 10/1995 | Simon ............... B41J 29/02 347/49 |
| 7,207,671 | B2 | | 4/2007 | Morris et al. |
| 7,213,902 | B2 | | 5/2007 | Devivo et al. |
| 10,513,132 | B2 | * | 12/2019 | Profaca ............ B41J 2/16511 |
| 2003/0235635 | A1 | * | 12/2003 | Fong ................. F24F 8/10 55/385.2 |
| 2010/0061865 | A1 | * | 3/2010 | Goldman ......... F24F 11/0001 417/1 |
| 2012/0164256 | A1 | * | 6/2012 | Swanson ........... B29C 64/209 425/162 |
| 2016/0243857 | A1 | | 8/2016 | Otsuka et al. |
| 2016/0297110 | A1 | * | 10/2016 | Wu ................. B29C 35/16 |
| 2017/0087849 | A1 | * | 3/2017 | Otsuka ............. B41J 2/155 |
| 2018/0200955 | A1 | * | 7/2018 | Hoelldorfer ...... B33Y 50/02 |
| 2019/0001574 | A1 | * | 1/2019 | Yackabonis ....... G06F 3/1219 |

FOREIGN PATENT DOCUMENTS

| | | | |
|---|---|---|---|
| EP | 1466743 | A2 | 10/2004 |
| JP | H11342630 | A | 12/1999 |
| JP | 2001010166 | A | 1/2001 |

OTHER PUBLICATIONS

"Printhead Cooling System", Retrieved from Internet: http://priorart.ip.com/IPCOM/000058918, Feb. 1, 1988 1 page.

\* cited by examiner

CONTROLLED COOLING FOR PRINT HEADS

BACKGROUND

Electronic devices may include cooling systems to maintain a desired operation temperature. A cooling system may include passive devices, such as a finned heat exchanger, or may include active devices, such as a fan. The cooling specifications for an electronic device establish the types and capacities of the cooling devices used in the cooling system.

BRIEF DESCRIPTION OF THE DRAWINGS

Various examples are described below referring to the following figures.

DETAILED DESCRIPTION

Figure 1:
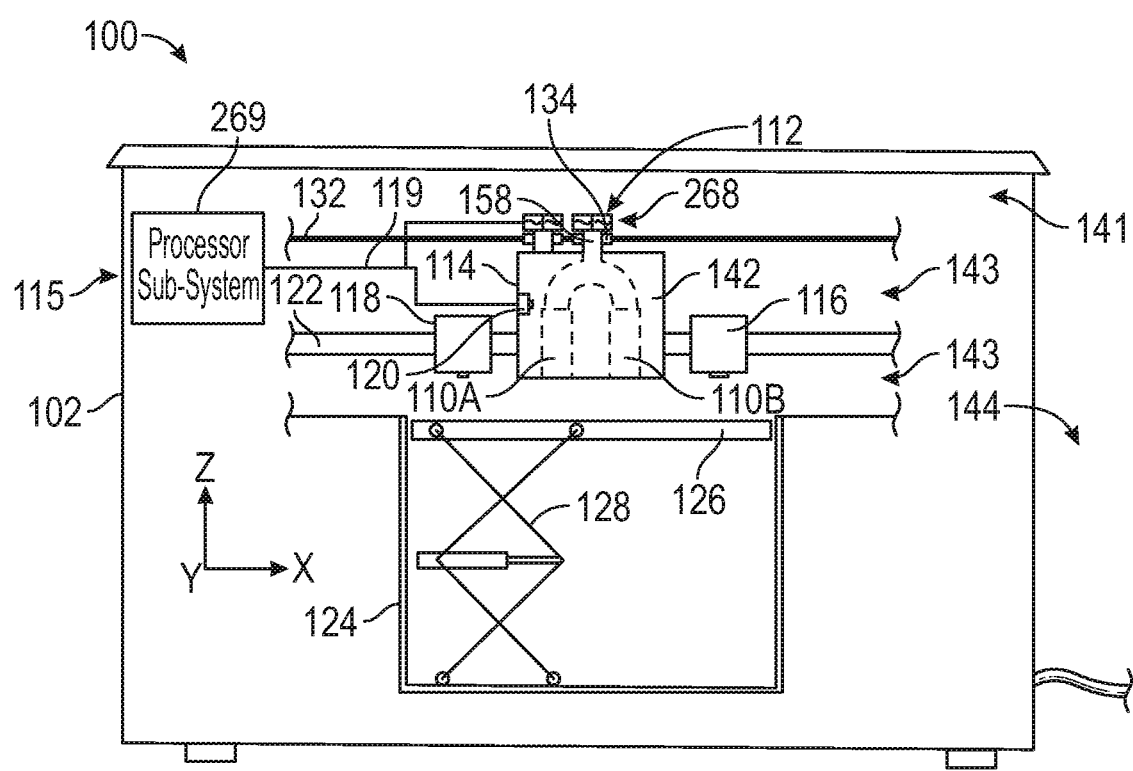
FIG. 1 shows a front schematic view of an electronic device having a cooling system in accordance with various examples.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port), while the terms "lateral" and "laterally" generally refer to positions located or spaced to the side of the central or longitudinal axis.

As used herein, including in the claims, the word "or" is used in an inclusive manner. For example, "A or B" means any of the following: "A" alone, "B" alone, or both "A" and "B." The word "or" is used in an inclusive manner. For example, "A or B" means any of the following: "A" alone, "B" alone, or both "A" and "B." In addition, when used herein including the claims, the word "generally" or "substantially" means within a range of plus or minus 20%, inclusive, of the stated value.

The concepts disclosed herein may be used to provide cooling to the print head and associated nozzle(s) of a three-dimensional (3D) printer. In general, the 3D printer may include a feed mechanism, a print head that comprises nozzles, a platform disposed below the print head, a cooling system to cool the print head and associated nozzles, and a heating element. The feed mechanism holds a build material (e.g., a bulk material such as a powdered structural material, such as a polymer or metal) and distributes a layer of the build material on the platform. The printer head sprays a fusing agent with the nozzle(s) in a selected pattern across the layer of the build material previously distributed on the platform. The printer head is mounted within a carriage, and moves with the carriage relative to the platform.

During 3D printing operations, the carriage and print head mounted thereto, move right and left along a first axis, and forward and backward along a second axis oriented perpendicular to the first axis to distribute or print the fusing agent on the layer of the build material at the desired locations. The heating element (e.g., a lamp) applies thermal energy to the deposited build material to cause those portions on which the fusing agent has been printed to fuse, whereas portions on which no fusing agent has been printed will not heat sufficiently to fuse. The heating element may be a lamp that moves relative to the platform, providing radiant heat, and the movement of the heating element may be synchronized with the movement of the carriage.

The cooling system circulates air across the print head to keep it cool and prevent excessive heating, which may cause damage to the print head, for example. In addition, the cooling system reduces the potential for unwanted substances, such as dust, to enter the carriage. In particular, the cooling system includes an air source to deliver a variable flow rate of the air to the print head within the carriage, a pressure sensor disposed within the carriage, and a controller to control the flow rate of the air. Using data from the pressure sensor, the controller maintains a first zone within the carriage at a positive pressure with respect to a second zone outside the carriage. Thus, the cooling system provides a closed-loop control of air flow to maintain a positive pressure within the carriage enclosure. In an example, the air source is a fan, the controller receives pressure data from pressure sensor, and the controller adjusts the speed of the fan in response to the pressure data. The cooling system may include an air duct to receive air from the fan and deliver the air to the carriage. The fan and air duct may move with the carriage and print head. The cooling system may also include a second fan coupled to an exit duct or an exit port to pull air from the carriage. The second fan may also be controlled by the controller.

Referring now to FIG. 1, an example electronic device 100 in accordance with the principles disclosed herein is shown. In this example, electronic device 100 includes a housing 102 for which a coordinate system may be defined by an x-axis, a y-axis, and a z-axis. In this example, the three axes are orthogonal with the x-axis extending lengthwise (left and right in FIG. 1), the y-axis extending widthwise (into and out of the page in FIG. 1), and the z-axis extending vertically (up and down in FIG. 1).

Electronic device 100 includes a first print head 110A, a second print head 110B, a cooling system 112 mounted in a pen carriage 114, and a control system 115 to operate cooling system 112. Control system 115 includes a sensor group 120, an actuator group 268, and a processor subsystem 269, communicatively-coupled by a wireless or wired connection 119, which are incorporated into cooling system 112. Sensor group 120 includes a sensor to measure a property or a parameter of a fluid in carriage 114, and actuator group 268 may participate as an air source.

Electronic device 100 also includes a material feed mechanism 116 to deposit sequential layers of build material on a vertically adjustable platform 126, a heating element 118, a guide bar 122, a bin 124, and a barrier wall 132. Pen carriage 114, feed mechanism 116, and heating element 118 are slidingly mounted to guide bar 122 to move parallel to the x-axis across bin 124 and platform 126. Pen carriage 114, feed mechanism 116, and heating element 118 may share a drive mechanism (not shown) or may each have a separate drive mechanism to move together or separately along bar 122. Device 100 may include a pair of laterally spaced guide bars disposed on opposite sides of pen carriage 114, feed mechanism 116, and heating element 118 and extending parallel to the y-axis. In some examples, pen carriage 114, feed mechanism 116, heating element 118 or combinations thereof are mounted to the pair of laterally spaced guide bars to move parallel to the y-axis perpendicular to the x-axis.

Platform 126 is disposed in bin 124 and can be moved parallel to the z-axis within bin 124 by a lift mechanism 128. Thus, lift mechanism 128 may move platform 126 vertically downward parallel to the z-axis in increments to allow platform 126 to receive sequential layers of build material and print agent. Lift mechanism 128 may move platform 126 vertically upward when preparing for the removal of a printed part or when preparing for a new print task. Bin 124 may be configured for customer-installation into housing 102 or removable from housing 102 to facilitate shipping, for replacement or repair, for removal of a printed part following a print operation, or for another reason.

Referring still to FIG. 1, barrier wall 132 is horizontally oriented and includes an aperture 134 through which cooling system 112 extends. Wall 132 is designed such that aperture 134 may move back-and-forth parallel to the x-axis (right and left in FIG. 1) such that aperture 134 moves with pen carriage 114. Within housing 102, a plurality of volumetric zones may be defined for convenience. These zones may be useful for describing the locations or movement of components or air. The space between wall 132 and housing 102 opposite carriage 114 defines an air source zone 141. The space within carriage 114 defines a carriage zone 142. A work zone 143 is positioned within housing 102 below wall 132 and around carriage 114. Thus, carriage 114 is located in work zone 143 along with feed mechanism 116, heating element 118, and bin 124. An outside zone 144 is located outside of housing 102.

Figure 2:
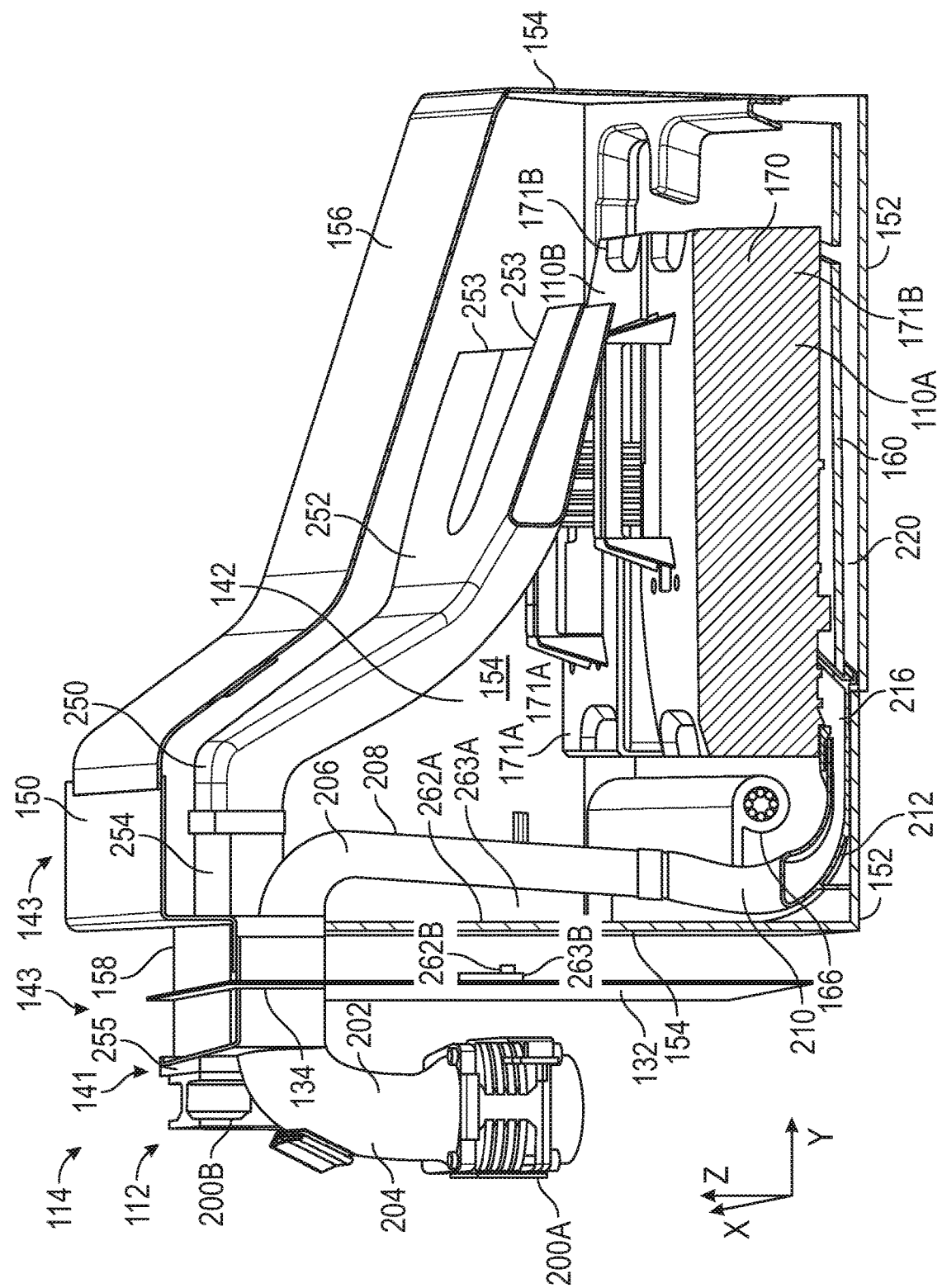
FIG. 2 shows a perspective partial cut-away view of the pen carriage of FIG. 1 in accordance with various examples.
Figure 3:
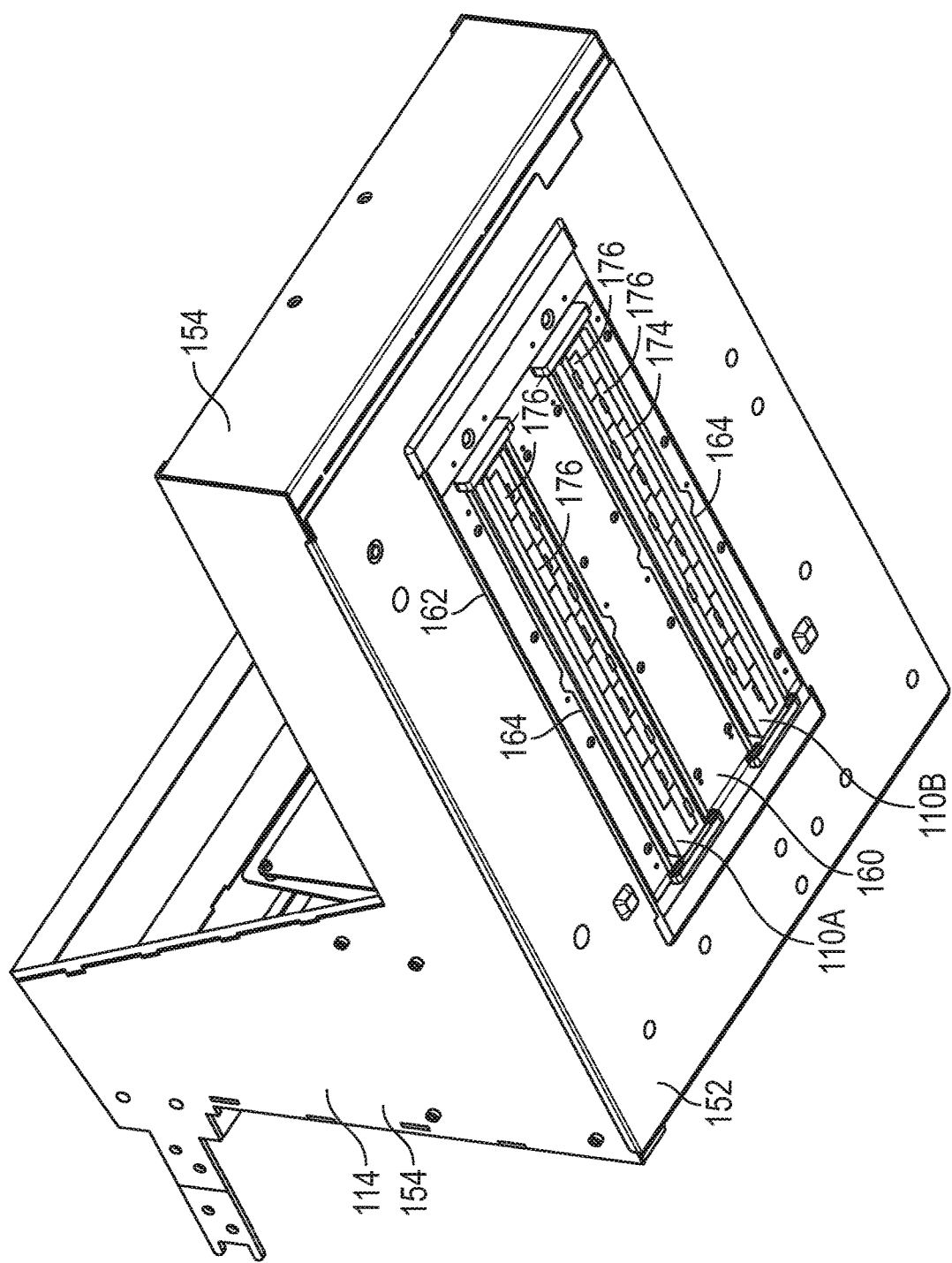
FIG. 3 shows a perspective bottom view of the pen carriage of FIG. 2 in accordance with various examples.

Referring now to FIGS. 2 and 3, pen carriage 114 is shown. In FIG. 2, barrier wall 132 is shown in phantom. The orientation of the coordinate system is the same as in FIG. 1. Pen carriage 114 includes a housing 150 having a base plate 152, a plurality of walls 154, a cover 156, and a tunnel 158 through which cooling system 112 extends. In FIG. 1, tunnel 158 is defined by four sides that extend through aperture 134 in barrier wall 132. Tunnel 158 may be sealingly coupled to barrier wall 132 to reduce or prevent air flow therebetween. Carriage 114 also includes an indexing sled 160 mounted above an aperture 162. Print heads 110A, 110B are mounted on top of sled 160, extending through an aperture 164. Sled 160 may slide parallel to the y-axis driven by an indexing motor 166 to adjust the position of print heads 110A, 110B with respect to carriage housing 150, device housing 102, or platform 126, allowing greater control over the location print heads 110A, 110B spray a print agent on platform 126.

Figure 4:
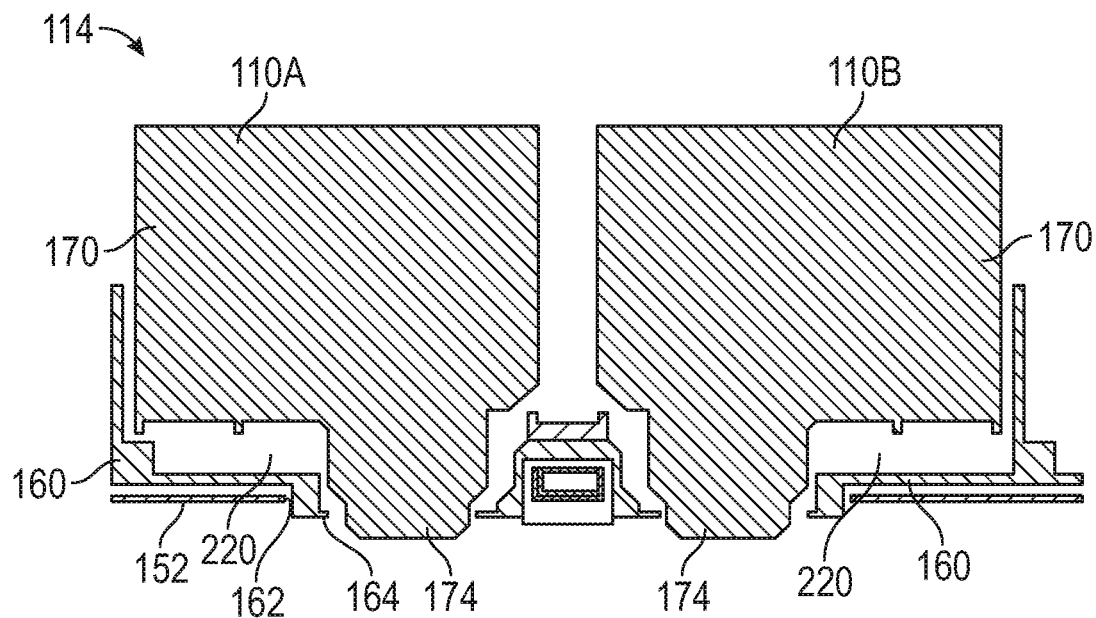
FIG. 4 shows a cross-sectional end view of the print heads mounted on the indexing sled of FIG. 2 in accordance with various examples.

Referring now to FIGS. 2-4, each print head 110A, 110B includes a body 170 extending from a first end 171A to a second end 171B and a nozzle portion 174 in which an array of nozzles 176 are disposed (FIG. 3). As shown in FIG. 4, first print head 110A and second print head 110B are mounted on indexing sled 160 and spaced above housing base plate 152, thereby creating a channel or duct therebetween. Print head 110A, 110B may also be referred to as a print bar, a pen, or another name used in the industry.

First print head 110A is coupled to a source of a first print agent or agents that may include, without limitation, an ink of a first color, multiple inks having multiple colors, a fusing agent, a detailing agent, or combinations thereof. Second print head 110B is coupled to a source of a second print agent or agents that may include, without limitation, an ink of a second color, multiple inks having multiple colors, a fusing agent, and a detailing agent.

Referring again to FIG. 2, cooling system 112 includes an inlet fan 200A, a first air conduit or duct 202 coupled to fan 200A, a second air conduit or duct 220 coupled to the opposite end of inlet duct 202, and an exhaust duct 250 coupled to an exhaust fan 200B. Inlet duct 202 is fixably coupled to housing 150, and thus, moves with housing 150 parallel to the x-axis. Moving from fan 200A to second duct 220, first duct 202 includes an inlet portion 204, a neck portion 206, a y-member or splitter 208, and a pair of transition elbows 210 coupled at the two ends of splitter 208 (only one elbow 210 visible in FIG. 2). Fan 200A and inlet portion 204 are located in air source zone 141. Splitter 208 and elbows 210 extend through carriage zone 142. Each elbow 210 extends to a horizontal discharge end 212 having an upward facing exit port 216 coupled to second duct 220 to deliver air to cool print heads 110A, 110B.

Second air duct 220 is positioned between print heads 110A, 110B and indexing sled 160. In this example, and as shown in FIG. 4, second duct 220 is formed, at least in part, by print heads 110A, 110B and indexing sled 160 for direct heat exchange between a supplied air flow and print heads 110A, 110B. Sled 160 may move back and forth parallel to the y-axis, along with print heads 110A, 110B to adjust the targeted locations for receiving print agent from the nozzles 176. During this movement, ducts 202, 220 continue to be coupled to transfer air.

Referring now to FIGS. 1 and 2, a path for a supplied air flow extends from air source zone 141, into fan 200A and through inlet air duct 202 to splitter 208, which divides the air flow into two separate air paths. Each air path of splitter 208 passes through a corresponding transition elbow 210 into a corresponding second air duct 220 alongside a print head 110A, 110B. The split air path continues through second duct 220 beneath or alongside the corresponding print head 110A, 110B and exits second duct 220 proximal second end 171B of print head 110A, 110B and into zone 142 within carriage 114. The air exiting the pair of second ducts 220 (one for each print head 110A, 110B), rejoins in zone 142 and ultimately exits carriage 114 through exhaust duct 250, pulled by exhaust fan 200B.

Second duct 250 includes a splitter 252 and a neck portion 254. Splitter 252 includes two inlet ports 253 in zone 142 within housing 150. The passages extending from ports 253 merge along splitter 252. The outlet end of splitter 252 is coupled to neck portion 254, which extends through housing tunnel 158 and connects to fan 200B at an exit end 255. Fan 200B draws air out from carriage zone 142 through duct 250.

Although exhaust fan 200B is located to transfer air from carriage zone 142 to air source zone 141, in some examples, fan 200B is instead positioned to discharge air into work zone 143. This arrangement may include having a port or duct 208 extending through housing cover 156.

In FIG. 2, inlet fan 200A and exhaust fan 200B are located in air source zone 141 and separated from work zone 143. Duct 250 and fan 200B are fixably coupled to housing 150, and thus, move with housing 150 parallel to the x-axis.

Outlet air duct 250 extends through tunnel 158 and fan 200B draws air from carriage zone 142 and exhausts the air into zone 141.

Figure 5:
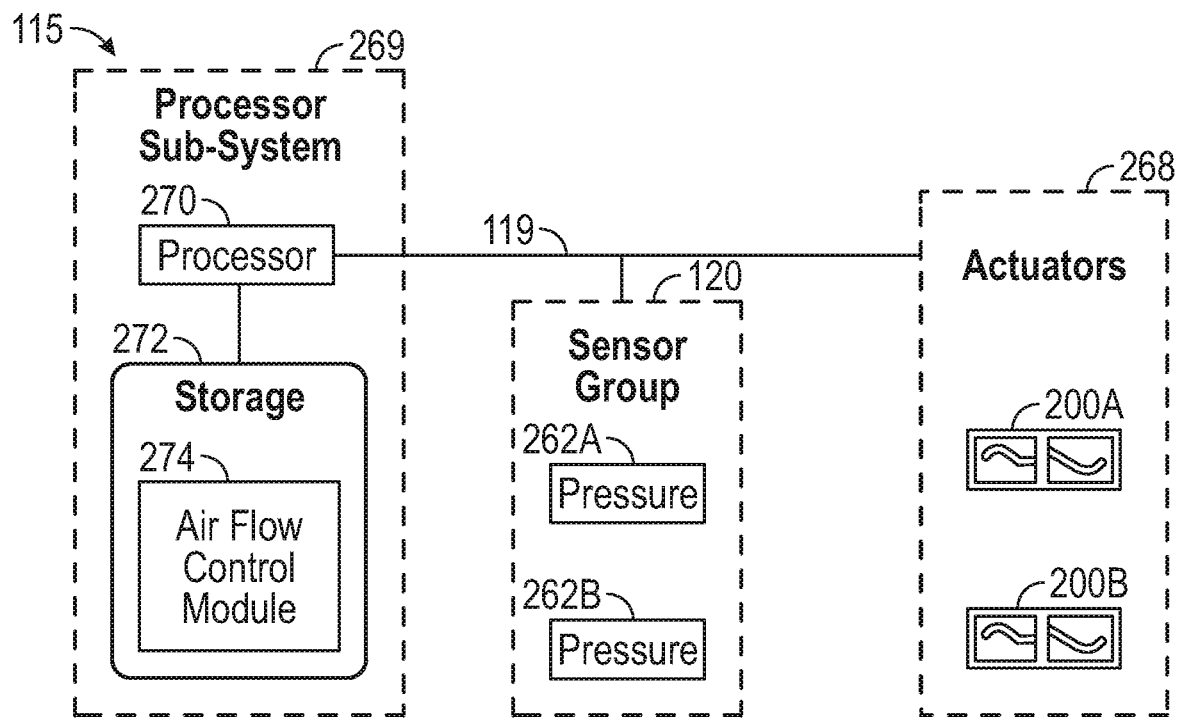
FIG. 5 shows a control system for the cooling system of FIG. 2 in accordance with various examples.

Referring now to FIG. 5, a schematic of control system 115 is shown. As described below, control system 115 adjusts and controls the operation of cooling system 112 to cool the print heads 110A, 110B and to maintain a positive pressure within carriage zone 142 relative to work zone 143. Control system 115 includes sensor group 120, actuator group 268, and processor sub-system 269, communicatively-coupled by connection 119.

The actuator group 268 includes fans 200A, 200B. Sensor group 120 includes pressure sensor 262A to measure a pressure inside the carriage zone 142 and a pressure sensor 262B to measure a pressure inside work zone 143. As examples, the fluid pressure measured by sensor 262A may be the pressure of air around or contacting print heads 100A, 100B, and the fluid pressure measured by sensor 262B may be the pressure of air around or contacting carriage 114. In FIG. 2, pressure sensor 262A is located within carriage zone 142 and includes a pressure port 263A in fluid communication with carriage zone 142. In FIG. 2, pressure sensor 262B is located within work zone 143 and includes a pressure port 263B in fluid communication with work zone 143. Each pressure sensor 262A, 262B may be an absolute sensor, which measures and communicates absolute pressures.

Referring again to FIG. 5, processor sub-system 269 includes a processor 270 and storage 272. Processor 270 may be a general-purpose microprocessor, digital signal processor, microcontroller, or other device capable of executing instructions retrieved from a computer-readable storage medium. Processor architectures generally include execution units (e.g., fixed point, floating point, integer, etc.), storage (e.g., registers, memory, etc.), instruction decoding circuitry, peripherals (e.g., interrupt controllers, timers, direct memory access controllers, etc.), input/output systems (e.g., serial ports, parallel ports, etc.) and various other components and sub-systems. In the present disclosure, any reference to a function performed by machine-readable instructions, or to machine-readable instructions performing a function is a shorthand manner for stating that the function is performed by a processor executing the instructions.

The storage 272 is a non-transitory computer-readable storage medium suitable for storing instructions executable by the processor 270. The storage 272 is also suitable for storing measurements received from the sensor group 120, calculated results, or other data. The calculated results that may be stored in storage 272 may include, as examples, as a pressure, a differential pressure, a comparison value, or a comparison result. The storage 272 may include volatile storage such as random access memory, non-volatile storage (e.g., a hard drive, an optical storage device (e.g., CD or DVD), FLASH storage, read-only memory), or combinations thereof.

The storage 272 includes an air flow control module 274 including instructions which, when executed, cause the processor 270 to perform the operations disclosed herein. For example, the instructions included in the module 274, when executed, may cause the processor 270 to direct a fan 200A, 200B to turn on, turn off, or to change speed. The instructions included in the module 274, when executed, may cause processor 270 to perform the operations of a method 300 or a method 350 described in more detail below.

Figure 6:
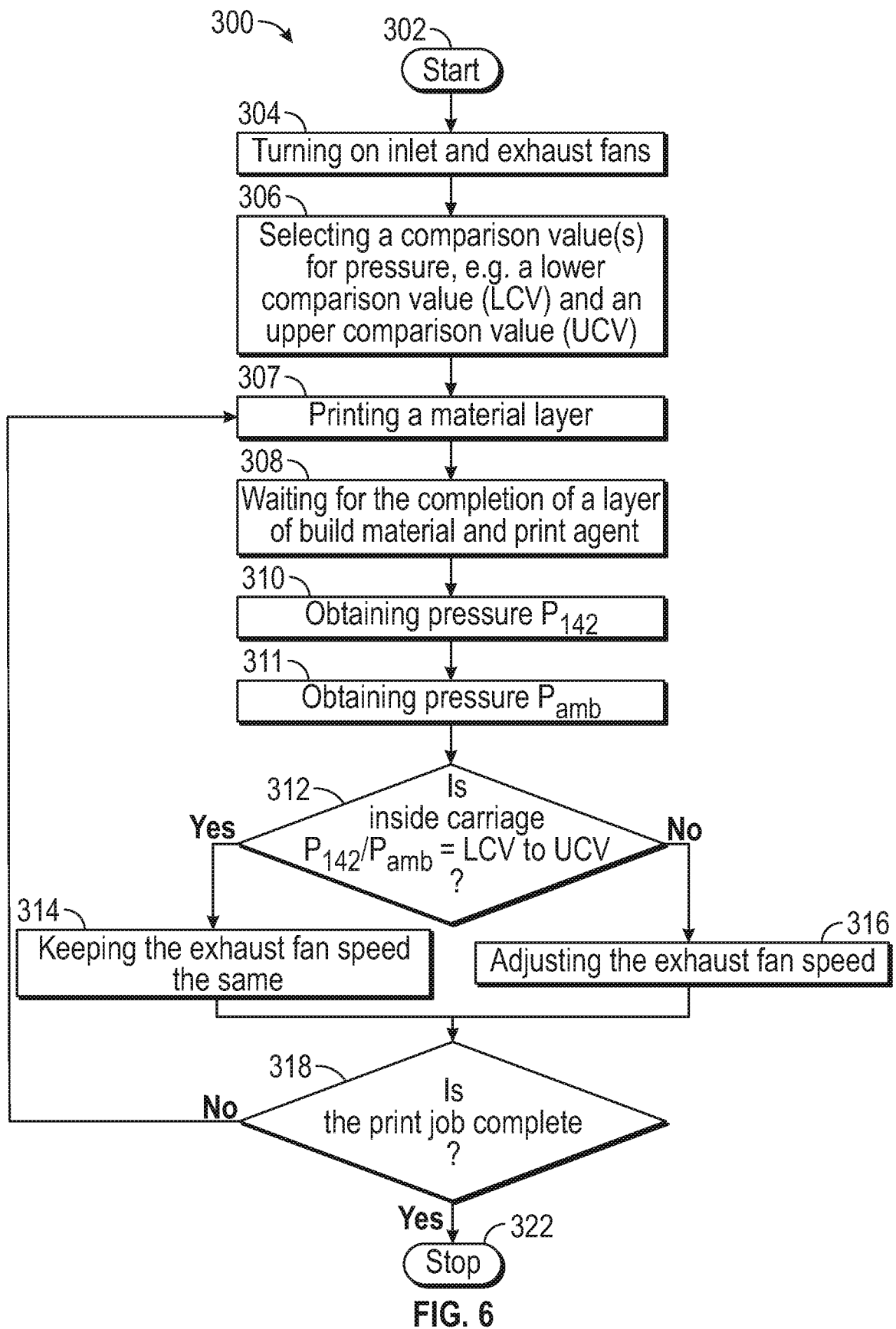
FIG. 6 shows a flow chart for a method of operating the cooling system of FIG. 2 using the control system of FIG. 5 in accordance with various examples.

Referring now to FIG. 6, a method 300 for operating cooling system 112 with control system 115 is shown. Method 300 starts at block 302 and ends at block 322.

Following block 302, block 304 includes turning-on the inlet fan 200A and exhaust fan 200B. Fan 200A may operate at a maximum speed for the particular model of fan, or it may operate at a selected, constant speed less than its maximum speed, as examples. Fan 200B may be started at a selected speed less than its maximum speed. For example, fan 200B may have a DC motor and may be started using a pulse width modulation (PWM) of power less than 100%. In an example, the starting PWM of fan 200B is selected from values ranging between 30% to 45% (inclusive).

Block 306 provides a comparison protocol between a pressure measurement $P_{142}$ from carriage zone 142 and a pressure value or measurement $P_{amb}$ from an ambient zone. Work zone 143 is an example of an ambient zone. Thus, $P_{amb}$ may be the measured pressure in work zone 143. Block 306 includes selecting a lower comparison value and upper comparison value for comparing to pressure $P_{142}$ to pressure $P_{amb}$. In the example, the comparison values are pressure ratios compared with an absolute pressure ratio $P_{142}/P_{amb}$. The lower comparison value is greater than 1.00 and may be 1.04 for example, and the upper comparison value is greater than the lower comparison value and may be 1.06 for example.

Block 307 includes printing a material layer including build material from feed mechanism 116 and print agent from print heads 110A, 110B. To add a timing sequence to method 300 and to avoid rapid cycling of method 300, control system 115 creates or monitors a period event. Block 308 includes waiting for the periodic event to occur before proceeding. In the example, the periodic event is the completion of printing a layer of build material and print agent.

Block 310 includes obtaining the pressure $P_{142}$. For example, pressure $P_{142}$ of zone 142 may be measured by pressure sensor 262A at port 263A. Block 311 includes obtaining the pressure $P_{amb}$. For example, pressure $P_{amb}$ may be measured by pressure sensor 262B at port 263B within zone 143, or pressure $P_{amb}$ may be estimated from data held in storage 272. Block 312 executes a pressure comparison using the pressures $P_{142}$, $P_{amb}$. In the example, if the pressure ratio $P_{142}/P_{amb}$ is between the lower comparison value and the upper comparison value, the result of the pressure comparison is positive, and the operation proceeds to block 314. A positive result of the pressure comparison means that pressure $P_{142}$ is within a targeted range. Block 314 includes keeping the speed of exhaust fan 200B at is current value.

If instead, pressure ratio $P_{142}/P_{amb}$ is less than lower comparison value or greater than the upper comparison, then the operation goes to block 316, which includes adjusting the speed of exhaust fan 200B, raising or lowering it as appropriate. Following either block 314, 316, the process proceeds to block 318, which includes an inquiry of whether or not the print job is complete. If the print job is not complete, the process returns to block 307 to repeat the cycle. Once the process reaches block 318 and the print job is complete, the process is stopped at block 322.

The logic or machine-readable instructions for method 300 may be stored in and retrieved from air flow control module 274 (FIG. 5) and may be executed by processor 270. Without limitation, the parameters and data for method 300 may be retrieved from air flow control module 274, may be provided by pressure sensor 262A, or may be entered through a user interface device, in any combination. The printing of layers of build material and print agent in block 307 may be controlled by control system 320 or by another control system in electronic device 100. In some examples of method 300, a comparison of pressure and adjustment of exhaust fan speed, such as blocks 312, 316, occur during or before the first usage of block 307, printing a material layer.

Referring again to method 300 in FIG. 6, if a pressure sensor 262A, 262B measures gauge pressure, control system 115 may convert the measured value to an absolute pressure $P142$, $P_{amb}$, respectively, based on another measurement of pressure or data held in storage 272 (FIG. 5).

Although the pressure comparison in FIG. 6 at blocks 306, 312 of method 300 involve a ratio of absolute pressures, in some examples, the pressure comparison is based on a difference in pressures, which may be made with absolute or gauge pressure.

Considering again to FIG. 1 and FIG. 2, in some examples, pressure sensor 262A is located in work zone 143 or another location, and pressure port 263A is in fluid communication with carriage zone 142. In some examples, sensor 262A is to measure a gauge pressure within carriage zone 142, referenced to the pressure in work zone 143, which is a differential pressure. In some examples, pressure sensor 262A includes a second pressure port in fluid communication with work zone 143 in addition to pressure port 263A in fluid communication with carriage zone 142, to measure a differential pressure between zones 142, 143. In such examples, the comparison value or values of block 306 in FIG. 6 includes a pressure difference or a range of pressure differences, and the comparison performed in block 312 involves comparing a measured differential pressure between zones 142, 143 against the comparison value(s).

Figure 7:
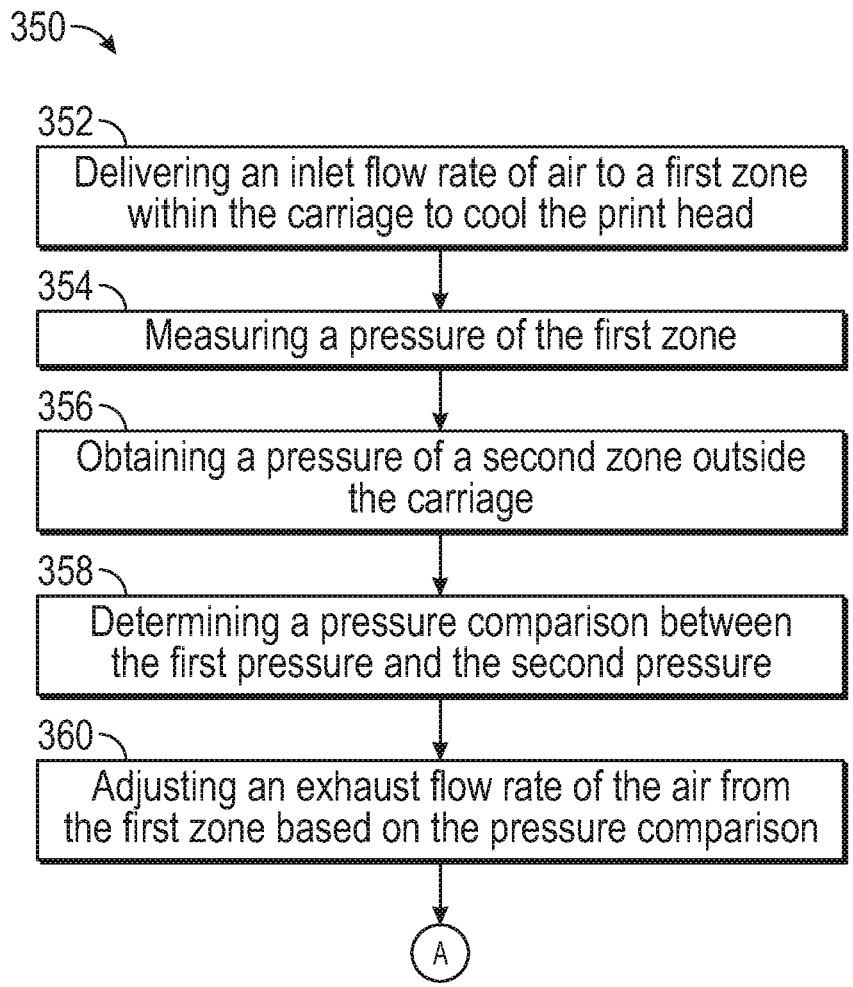
FIG. 7 shows a flow chart for a method of cooling a print head in accordance with various examples.

Referring now to FIG. 7, a method 350 for cooling a print head is shown. Method 350 may be implemented, for example, via cooling system 112 and control system 115. Beginning at block 352 in FIG. 5, method 350 includes delivering an inlet flow rate of air to a first zone within the carriage to cool the print head, as may be accomplished by activating fan 200A, for example. At block 354, method 300 includes measuring a pressure of the first zone. For example, the first zone may be a carriage of zone 142, having a pressure $P_{142}$, which may be measured by sensor 262A. Block 356 includes obtaining a pressure of a second zone outside the carriage. As examples, the second zone may be work zone 143 having a pressure $P_{amb}$, which may be measured by sensor 262B, or may be estimated from data held in storage 272. Block 358 includes determining a pressure comparison between the first pressure and the second pressure. Examples include the pressure comparison explained in reference to FIG. 6 or another pressure comparison according to the examples herein.

Referring still to FIG. 7, at block 360 method 350 includes adjusting an exhaust flow rate of the air from the first zone based on the pressure comparison. An example is adjusting the speed, flow rate, or power of exhaust fan 200B, according to the examples herein.

Figure 8:
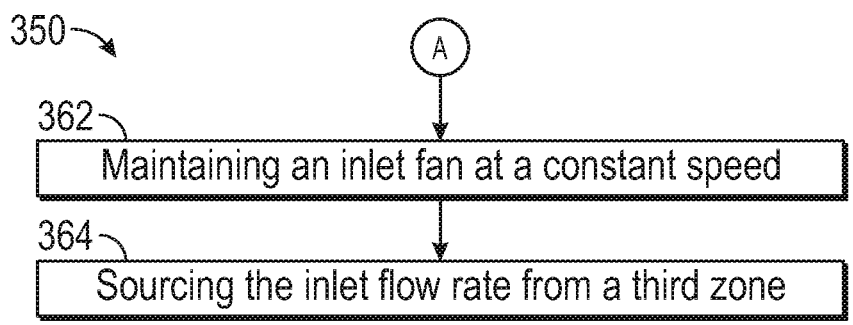
FIG. 8 is a continuation of the schematic block diagram of FIG. 7 in accordance with various examples.

Referring now to FIG. 8, method 352 may be continued at block 362, which includes maintaining an inlet fan at a constant speed. The inlet fan may be fan 200A. Block 364 includes sourcing the inlet flow rate from a third zone. The third zone may be air source zone 141.

The above discussion is meant to be illustrative of the principles and various examples of the present disclosure. Numerous variations and modifications to the examples described above are possible. The following claims should be interpreted to embrace all such variations and modifications. For example, although various examples of the electronic devices disclosed were 3D printer, the cooling systems disclosed herein may be implemented in other types of printers or other types of electronic devices.

What is claimed is:

1. An electronic device comprising:
    a carriage to move along an axis relative to a platform;
    at least one print head disposed within the carriage to move with the carriage and to deliver a print agent to the platform; and
    a cooling system including:
        an air source to deliver air to the at least one print head via a first zone surrounding the at least one print head within the carriage to cool the at least one print head;
        a first pressure sensor to measure an air pressure of the first zone within the carriage;
        a second pressure sensor to measure an air pressure of a second zone outside of the carriage; and
        a controller to control a flow rate of the air into the first zone or from the first zone in response to measured pressures to maintain the first zone at a positive air pressure with respect to the second zone, wherein the measured pressure is a differential pressure between the first zone and the second zone, wherein the differential pressure has a ratio of between 1.04 and 1.06.

2. The electronic device of claim 1, wherein the flow rate of the air to be controlled is an exhaust flow from the first zone to a location outside the carriage.

3. The electronic device of claim 2, wherein the cooling system comprises an exhaust fan to pull the exhaust flow, and wherein the controller is to adjust the speed of the exhaust fan to control the flow rate of the exhaust flow.

4. The electronic device of claim 1, wherein:
    the air source includes an inlet fan to operate at a constant speed to draw the air from a third zone and to push the air into the first zone and to the at least one print head, and
    the cooling system comprises an exhaust fan to operate at a variable speed to pull the flow rate of the air to be controlled by the controller.

5. The electronic device of claim 1:
    further comprising a second print head disposed within the carriage; and
    wherein the cooling system further comprises an air duct between a print head and the second print head to direct air from the air source to the print head and the second print head.

6. The electronic device of claim 5, wherein the air duct comprises:
    a splitter to divide an air flow into two separate air paths and direct respective air paths to the print head and the second head; and
    a first upward facing exit port to deliver air to the print head; and
    a second upward facing exit port to deliver air to the second print head.

7. The electronic device of claim 1, further comprising:
    a barrier wall formed on the carriage; and
    an aperture in the barrier wall through which the cooling system extends.

8. The electronic device of claim 1, further comprising:
    a second fan to pull air from the carriage;
    an exhaust duct to direct drawn air away from the carriage; and
    a splitter having two inlet ports, wherein each inlet port is adjacent to a respective print head.

* * * * *